United States Patent
Belchee et al.

(10) Patent No.: US 8,931,050 B2
(45) Date of Patent: Jan. 6, 2015

(54) MOBILE APPLICATION ACCESS CONTROL

(75) Inventors: William Blake Belchee, Charlotte, NC (US); Julie M. Ingalls, Newark, DE (US); Michael Emil Ogrinz, Easton, CT (US); Richard A. McEntee, Charlotte, NC (US); K. Kanaka Subramaniam, Chennai (IN); Jogeswar Sarma Malapaka, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 13/215,755

(22) Filed: Aug. 23, 2011

(65) Prior Publication Data
US 2013/0055345 A1 Feb. 28, 2013

(51) Int. Cl.
*G06F 21/00* (2013.01)
*G06F 21/62* (2013.01)

(52) U.S. Cl.
CPC .................................. *G06F 21/6218* (2013.01)
USPC .................................... 726/3; 709/223; 726/8

(58) Field of Classification Search
CPC .... G06F 21/6218; H04L 63/102; H04L 67/22
USPC .......................................... 726/3, 8; 709/223
See application file for complete search history.

(56) References Cited

U.S. PATENT DOCUMENTS

| 5,751,287 A * | 5/1998 | Hahn et al. ..................... 715/775 |
| 6,286,001 B1 * | 9/2001 | Walker et al. ................. 707/697 |
| 2007/0027734 A1 * | 2/2007 | Hughes ............................ 705/7 |
| 2008/0052383 A1 * | 2/2008 | O'Shaughnessy et al. ... 709/223 |
| 2010/0175118 A1 * | 7/2010 | Backlund .......................... 726/8 |

OTHER PUBLICATIONS

Dias, C. (2001). Corporate portals: a literature review of a new concept in Information Management. International Journal of Information Management, 21(4), 269-287.*

* cited by examiner

*Primary Examiner* — Syed Zaidi
(74) *Attorney, Agent, or Firm* — Banner & Witcoff, Ltd.; Michael A. Springs

(57) ABSTRACT

Systems and methods of controlling access to one or more mobile applications are provided. In some examples, a plurality of business groups may be identified. One or more mobile applications may be associated with each business group. An individual determined to be associated with the business group may then receive, on a mobile device, access to the one or more mobile applications associated with the business group with which he/she is associated. In some examples, the one or more mobile applications may include native applications, web or Internet based applications and/or third party applications provided in a portal. In some examples, the portal may "take over" or mimic the desktop of the mobile device. The systems, methods, and the like may also prevent access to one or more applications not associated with the business group of the individual.

20 Claims, 6 Drawing Sheets

MOBILE APPLICATION ACCESS CONTROL

BACKGROUND

In today's fast-paced world, individuals have come to rely on mobile devices to provide an efficient way to stay connected to work. Mobile devices are no longer just used for phone and email services. Rather, these devices now run a variety of applications which users may desire to work efficiently when out of the office. These applications may include applications native to the device or applications resident on a server remote from the device and run via a network, such as the Internet. Accessing these applications can be cumbersome.

In addition, many companies provide mobile devices to employees. In conventional systems, the companies have little, if any, control of what applications are on a user device. Accordingly, a system and method of providing a convenient method of accessing applications and controlling what applications are provided on a mobile device would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, systems, methods, apparatuses, and computer readable media controlling access to applications on a mobile device are provided. In some examples, a plurality of business groups may be identified. One or more mobile applications associated with each business group may also be identified. In some examples, a user may be identified and associated with one of the identified business groups. The user may then receive access to the one or more mobile applications associated with the business group with which the user is associated. In some arrangements, the user may be prevented from accessing other applications not associated with the business group or applications on the mobile device not associated with the business group may be deleted. The applications may be provided to the user via a portal.

Other aspects of the disclosure relate to interrogating one or more functions of the mobile device. If the interrogated function is an approved function, access to the function may be allowed and, in some examples, the function may be provided in the portal. Alternatively, if the interrogated function is not approved, the function may be removed or deleted from the device.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
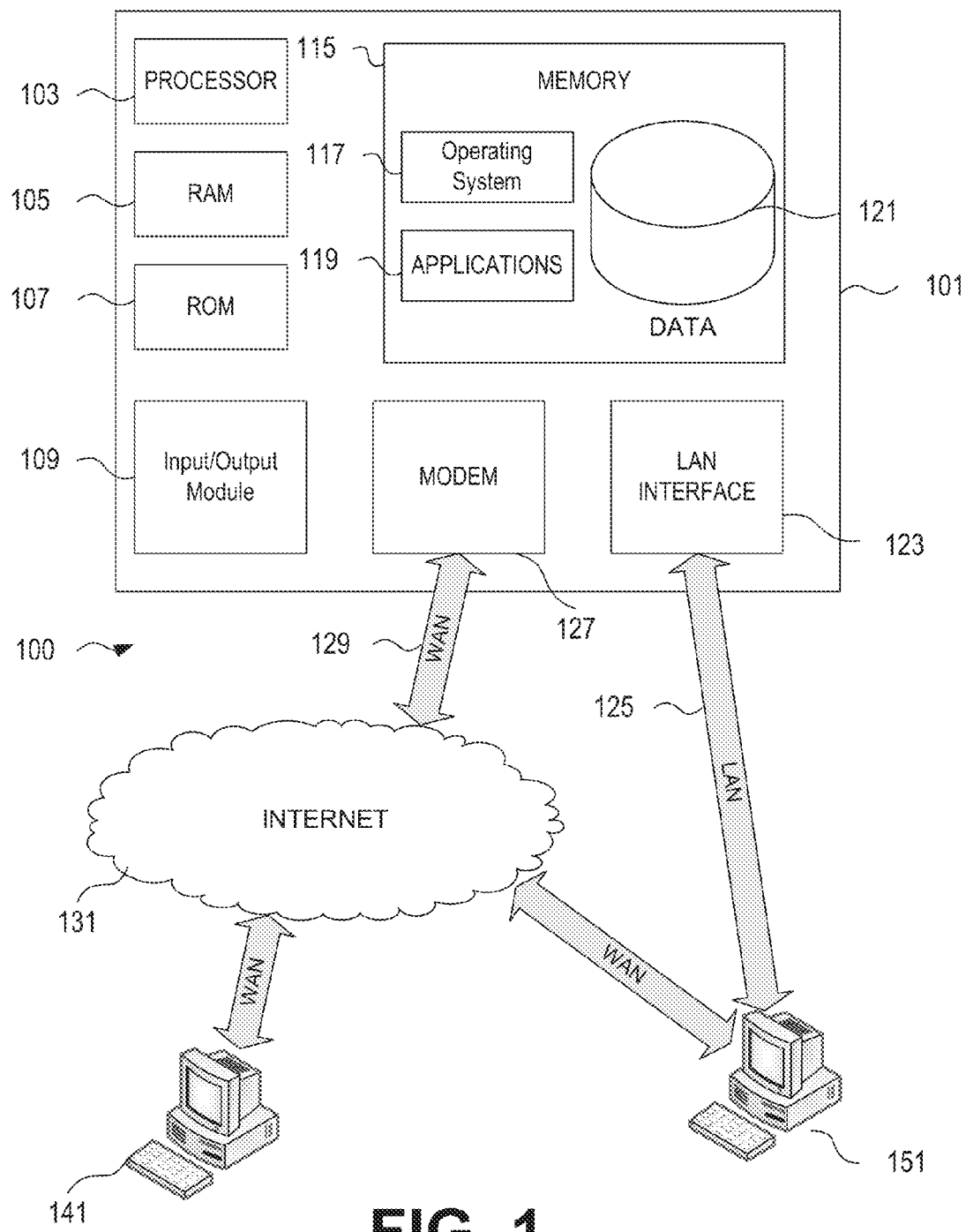
FIG. 1 illustrates an example operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computing device 101 may have a processor 103 for controlling overall operation of the device and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the server 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses or corporate entities, such as financial institutions or other entities, to provide and/or control access to applications on a mobile device, such as a mobile device provided to a user by the business or entity. For instance, a business may provide employees with a "company mobile device." Because the company is likely paying for a portion or all of the device, monthly services fees, and the like, the company wants to control the applications being used on the device. As used herein, applications may include native applications which are downloaded or otherwise loaded onto the mobile device (e.g., are resident on the mobile device) and are run from the mobile device. Applications, as used herein, may also include web or internet-based applications that may be accessed from the mobile device but are not resident on the mobile device and are run on a device remote from the mobile device (e.g., a server of the entity offering the application accessed via the Internet, and the like).

Accordingly, a company may desire to provide applications deemed acceptable or necessary for a particular user, such as via an applications portal, for instance, on a mobile device. The portal may include a plurality of icons or other indicia representing the applications and may include icons associated with native and Internet-based applications. That is, selection of an icon from the portal may automatically launch the application, regardless of whether the application is native on the device or is housed remotely from the device and accessed via the Internet or a third party. The company may also, in some arrangements, automatically remove or delete applications deemed unnecessary or unacceptable for the user.

Although several examples used herein may include reference to a financial institution or bank, the systems, methods, apparatuses, and computer readable media described herein may be used in a variety of industries (e.g., service and non-service industries), corporations, businesses, government agencies, universities, and the like. Nothing in the specification or figures should be viewed as limiting the invention to only use with banking or banking related companies or entities.

Figure 2:
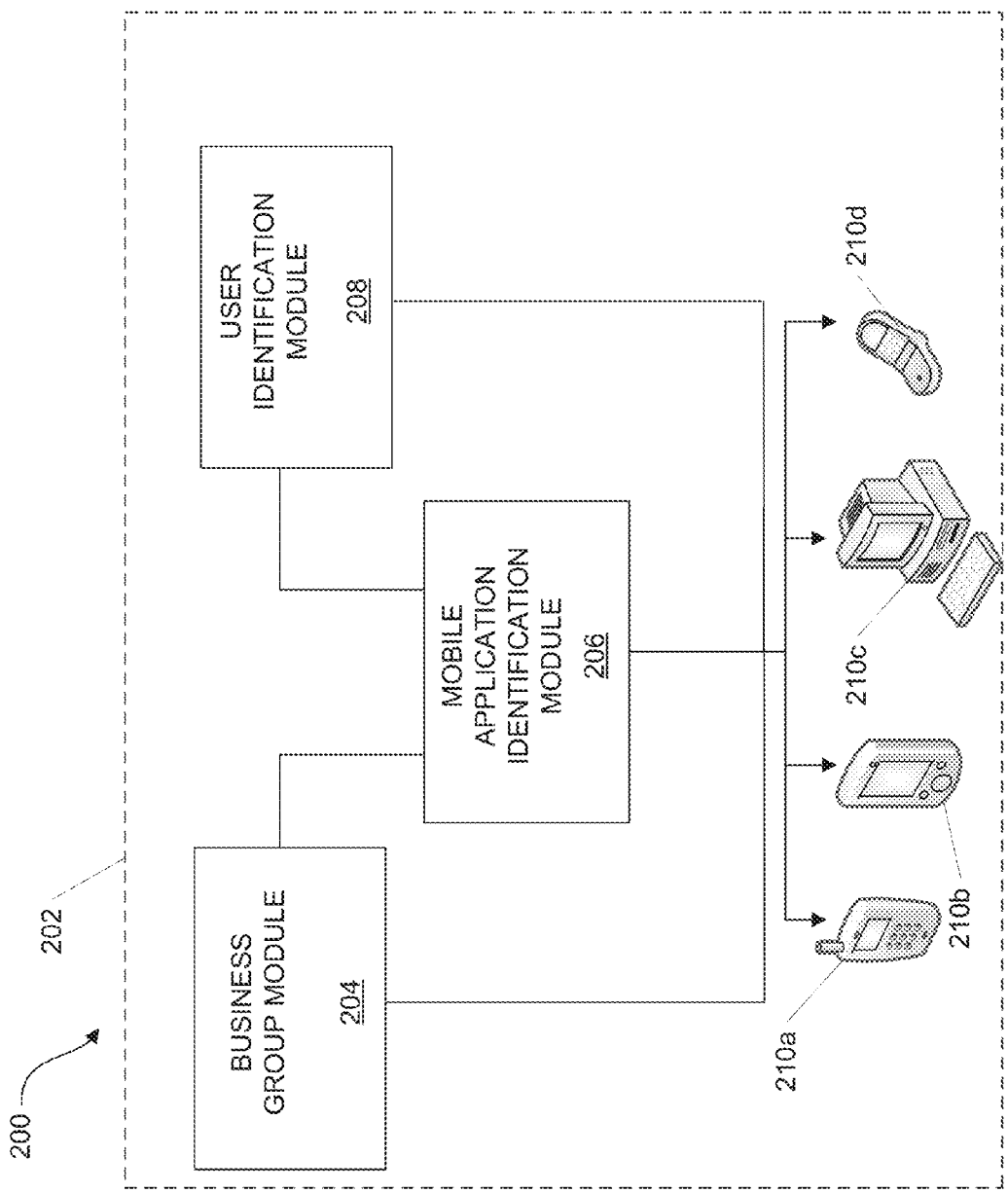
FIG. 2 illustrates an example system for controlling access to mobile applications on a mobile device according to one or more aspects described herein.

FIG. 2 illustrates one example mobile application access control system according to at least some examples described herein. One or more modules shown in FIG. 2 may be separate devices or may, in some examples, be within the same physical device. The mobile application access control system 200 may be part of or associated with an entity 202, such as the entity implementing the system. The entity may be a business, corporation, university or other educational institution, government agency, and the like. In some examples, the entity may be a financial institution, such as a bank. For simplicity, the mobile application access control system 200 will be described in terms of a financial institution and may be described in the context of providing or controlling access to mobile applications used by a financial institution. However, nothing in the specification or figures should be viewed as limiting the mobile application regulating system to only banks or banking related entities.

The mobile application access control system 200 may include a business group model 204. The business group model may identify one or more business groups within the entity 202. For instance, business groups may be defined by a work function (e.g., human resources, accounting, finance, and the like) or may be defined by level (e.g., vice president, senior vice president, and the like). In some examples, the identified business groups may be stored on a server that may be accessed by a plurality of devices 210, such as smartphone 210a, personal digital assistant (PDA) 210b, computer terminal 210c (which may include desktop, laptop, netbook, and the like computing devices) and/or cell phone 210d, as will be discussed more fully below.

The mobile application access control system 200 may further include a mobile application identification module 206. The mobile application identification module 206 may identify one or more applications associated with each business group. For instance, the mobile application identification module 206 may determine applications (including native, web or Internet-based applications, third party applications, and the like) that may be necessary or acceptable for individuals associated with each business group. The applications may be identified based on type of work being performed by the group, level of interaction with other groups, access to data needed to perform the work functions of that group, and the like. The association between the identified applications and the business group may provide a standard set of applications for all individuals associated with a particular business group. In some examples, the device on which the applications are being provided, e.g., mobile devices 210a, 210b, 210d, and the like may automatically delete or remove applications not identified as associated with the particular business group with which that mobile device is associated, as will be discussed more fully below.

The mobile applications access control system 200 may further include a user identification module 208. The user identification module 208 may identify (such as via a look-up table) one or more business groups with which a user or individual is associated. Once a determination is made as to which business group(s) a user is associated with, a user profile for the user may be generated and provided to a mobile device (such as device 210a, 210b, 210d, and the like) of the user. As will be discussed more fully below, each device 210 may have a unique identifier and the user profile generated for the user may be associated with that unique identifier. The profile may be provided to the mobile device and may include the applications identified (such as by mobile application identification module 206) for the business group(s) with which the user is associated. In some examples, the user device 210 may receive only those applications associated with the business group with which the user is associated. In some arrangements, any other applications not associated with the business group may be removed or deleted from the user device 210. The applications may, in some examples, be provided to a user via a portal, as will be discussed more fully below.

Figure 3:
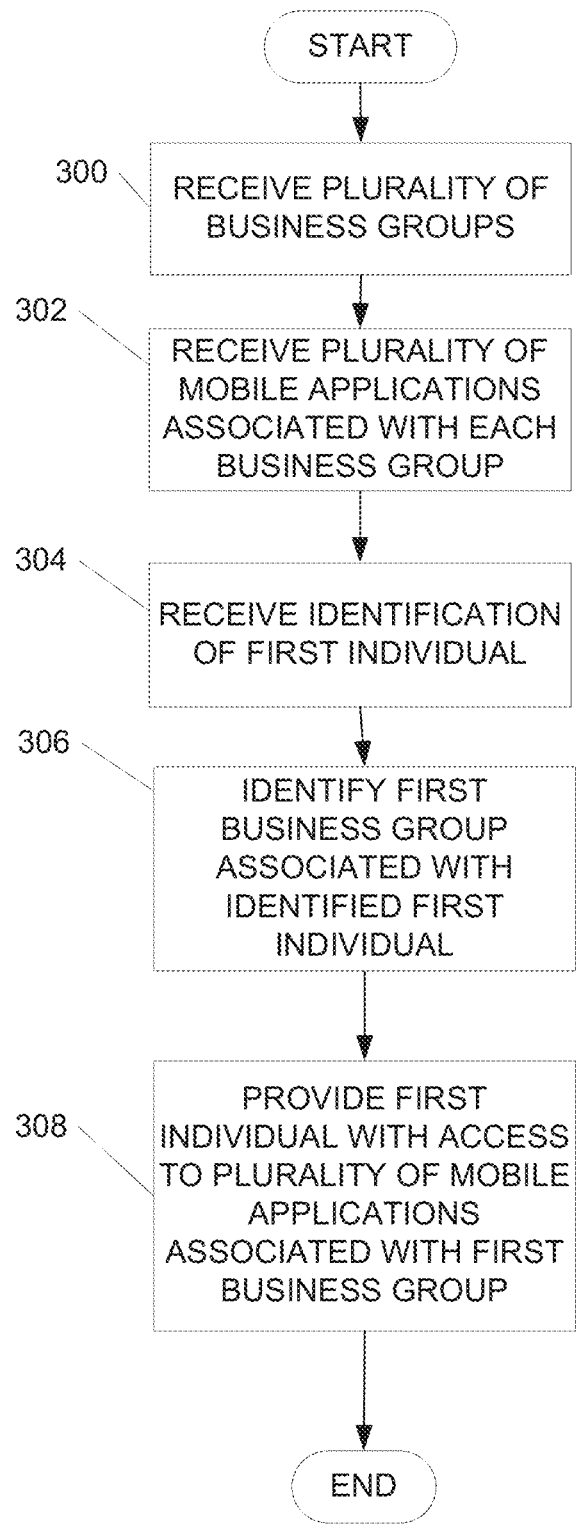
FIG. 3 illustrates one example method of controlling access to mobile applications on a mobile device according to one or more aspects described herein.

FIG. 3 illustrates one example method of controlling access to applications on user devices according to one or more aspects described herein. In step 300, a plurality of business groups may be received. As discussed above, the business groups may be defined by type of work performed, organization or department, level of seniority or rank, and the like. In step 302 a plurality of mobile applications associated with each of the business groups may be received. As discussed above, the mobile applications associated with the business groups may be determined based on work performed by the business group, type of data to which access is needed, and various other criteria. The mobile applications may include native applications, web or Internet based applications, third party applications, and the like. In step 304 identification of a first individual may be received and in step 306 one or more business groups with which the individual is associated may be determined. The individual may be deemed associated with a business group, for example, if the user works in that department, has a supervisory role over the department, and the like. For instance, an individual working in a human resources function within a business may be associated with a human resources business group. That same individual may also oversee, but not necessarily work in, an accounting group. The individual may then be associated with both the human resources business group and the accounting business group.

In step 308 the user may be provided with access to any applications associated with the business group(s) with which they are associated. In some examples, the business group information and applications associated with the identified business group(s) may be stored at a server remote from the user's mobile device. The mobile device may access the server to determine the applications to provide to the user. Additionally or alternatively, a server may force applications down to a mobile device of a user associated with a business group. For instance, the applications may be provided on a portal on the mobile device of the user.

This arrangement may provide a level of control over the applications a user may access on a mobile device. For instance, many companies provide employees with a mobile device (e.g., pay for the device, pay for all or a portion of a monthly service fee, and the like). These companies do not want unnecessary or extraneous applications on the device of the user that may occupy space on the device, cost money, and the like. Thus, this arrangement allows companies to identify applications a user may need to perform his or her work function and provide only those applications to the user. Similarly, if a company decides to utilize a different vendor for an application tool used by its employees on a mobile device, the system can automatically remove/delete the old work-related application from the mobile device of the user and install/provide a new one by the preferred vendor.

Figure 4:
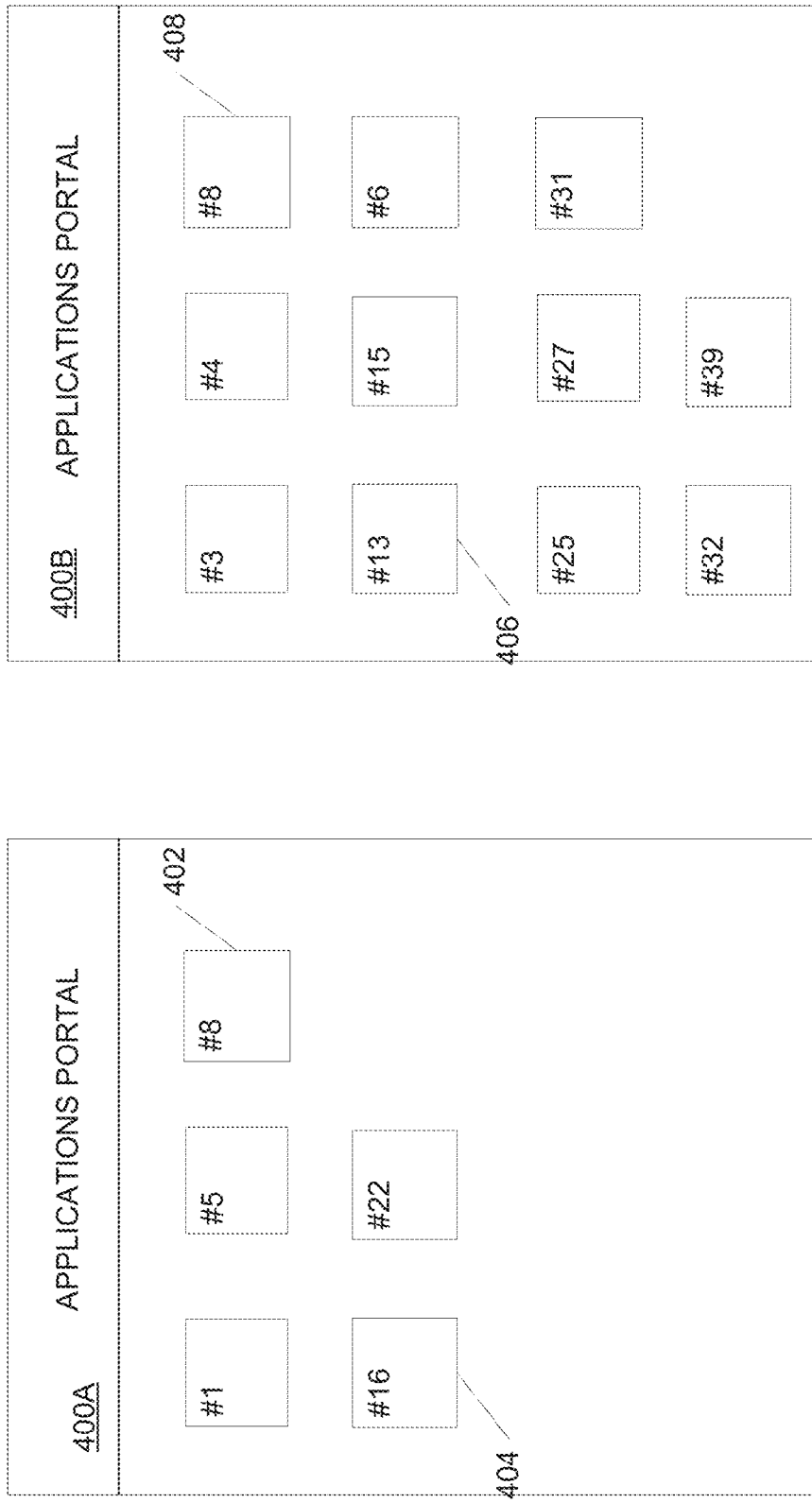
FIGS. 4A and 4B illustrate example user interfaces for providing applications to a user associated with a business group according to one or more aspects described herein.

In some examples, the applications may be provided on a portal, such as the portal shown in FIGS. 4A and 4B. In some examples, the portal 400 may "take over" a desktop user interface or home screen of a user device. That is, the portal may appear similar to a standard desktop user interface or may mimic the standard user interface but may include only the applications associated with the business group of the user. In some examples, this may occur automatically upon start-up of the device. Alternatively, a user may launch the portal application as desired.

The portal 400 may provide access to all applications identified for a particular business group with which the user is associated. For instance, portal 400A of FIG. 4A may be a portal of a user associated with a human resources business group. The applications 402, 404 provided on the portal 400A may be those determined to be associated with the human resources business group. As discussed above, the applications 402, 404 may include both native applications (e.g., those applications resident on the device and run from the device) as well as web or Internet-based applications that may be accessible and/or run from a remote server.

Portal 400B of FIG. 4B may be on a device of a user associated with a finance business group. The portal 400B includes more and different applications (such as applications 406 and/or 408) than the portal 400A provided in FIG. 4A to a human resources business group individual. The applications necessary or desirable to perform the work functions in human resources and finance may be different and thus, the applications provided to users associated with each group may be different.

Further, as a user changes jobs, positions, and the like, the business group with which the user is identified may also change. When the business group of a user is updated, the user may receive the applications associated with the new business group and, in some examples, the applications associated with the previous business group (or business group of the previous position) may be removed or deleted. In some examples, the applications may remain on the device but may not be visible or displayed in the portal.

In some examples, the application providing the portal may be used to interrogate the device or various applications on the device to determine whether they are those associated with the business group of the user. If so, the application may remain on the device. If not, the application may be removed or deleted from the device. In some examples, the application may be automatically deleted or removed. In other examples, the user may select the applications to remove or may accept or allow deletion of the application not associated with the business group of the user.

Figure 5:
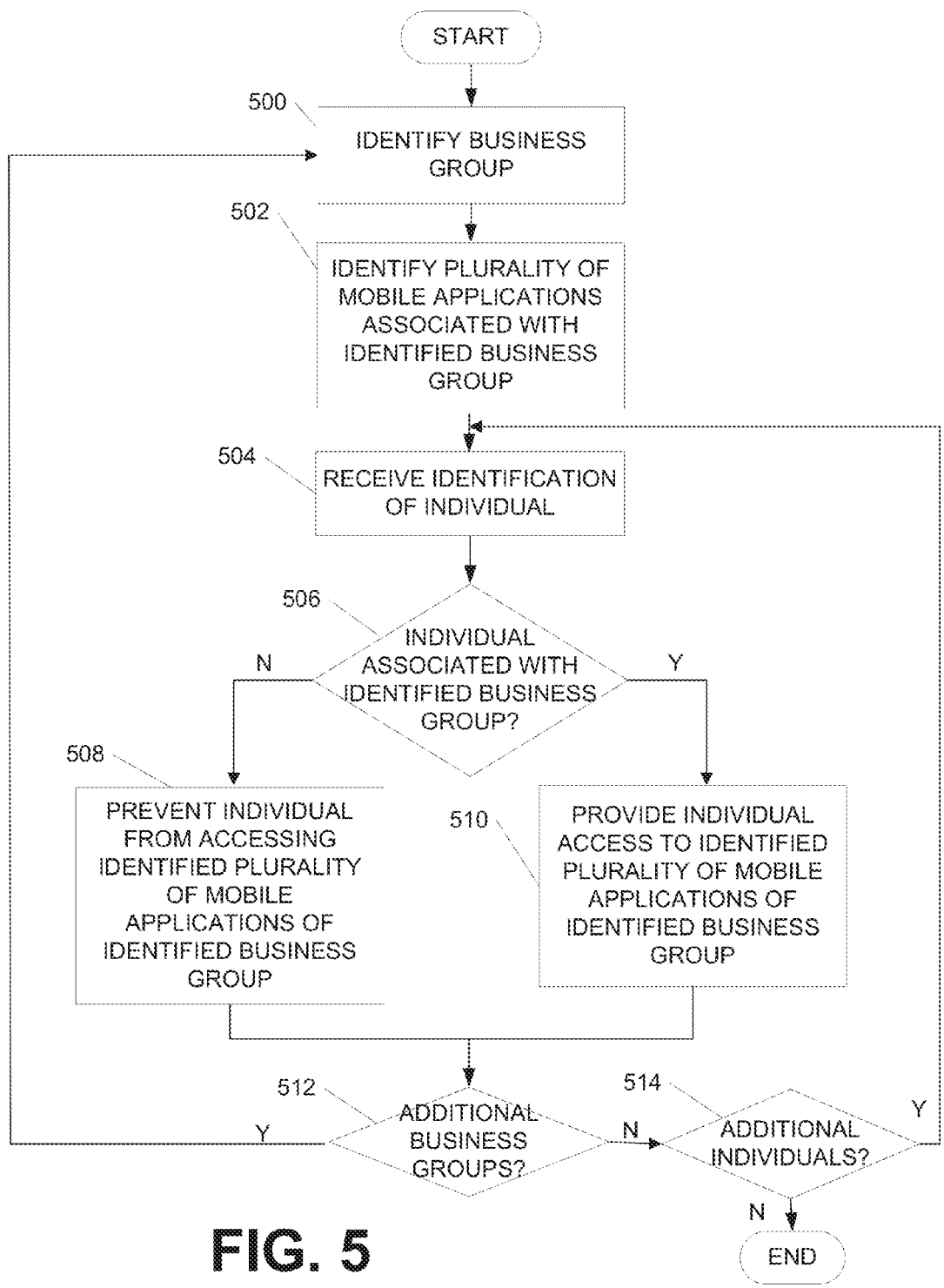
FIG. 5 illustrates one example method of controlling mobile applications on a mobile device according to one or more aspects described herein.

FIG. 5 illustrates another example method of controlling access to applications on a mobile device according to one or more aspects described herein. In step 500, a business group is identified. In step 502, a plurality of mobile applications associated with the identified business group is identified. In step 504, identification of an individual is received. In step 506, a determination is made as to whether the identified individual is associated with the identified business group. If so, access to the plurality of applications associated with that business group is provided to the identified individual in step 510. Alternatively, if the identified individual is not associated with the identified business group, access to the plurality of applications associated with that business group may be prevented in step 508.

In step 512, a determination is made as to whether additional business groups are available. If so, the process may return to step 500 to identify another business group. If no additional business groups are available, a determination is made as to whether additional individuals are available for evaluation in step 514. If so, the process may return to step 504 to identify another individual. If not, the process may end.

Figure 6:
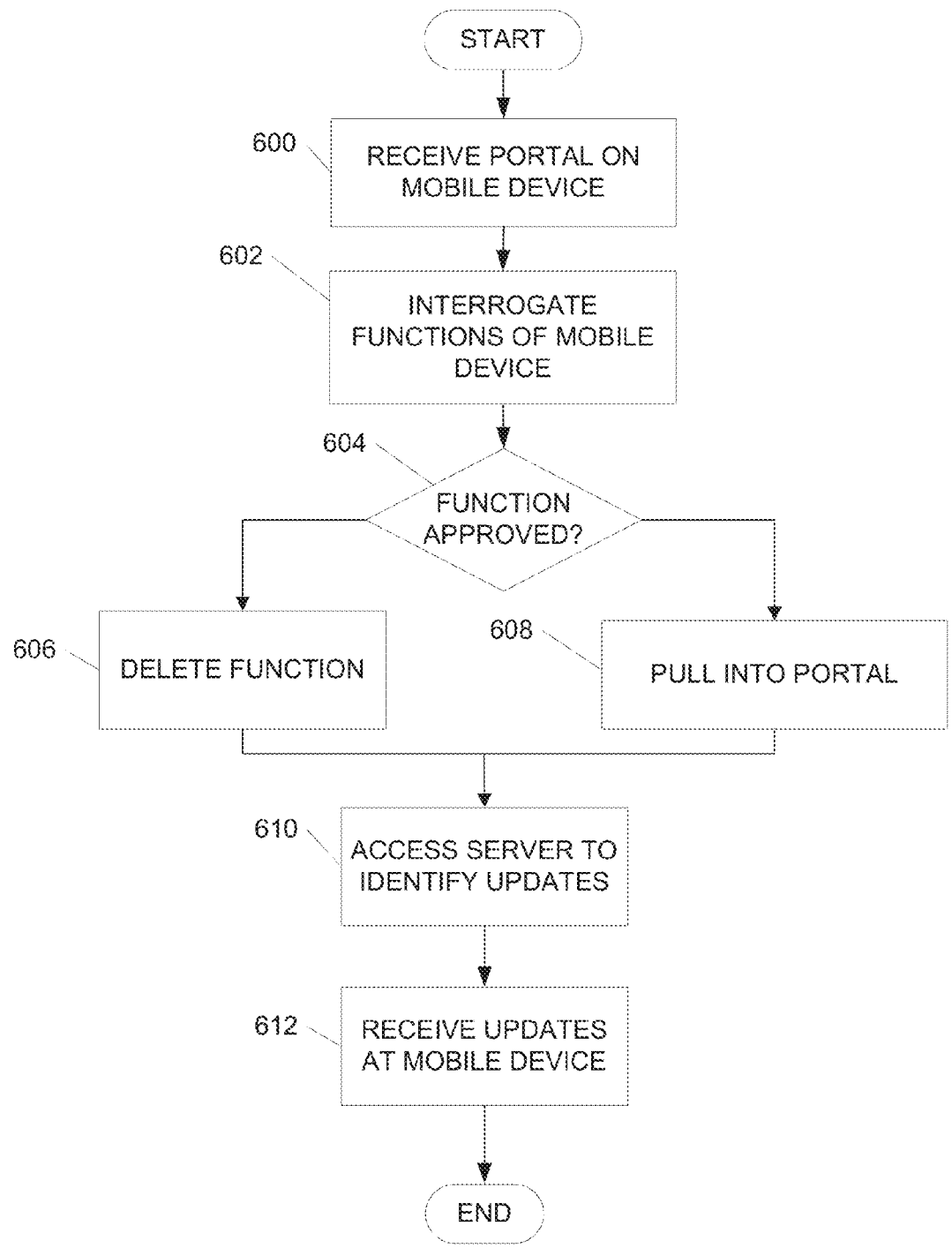
FIG. 6 illustrates one example method of interrogating functions and updating a portal providing mobile applications according to one or more aspects described herein.

FIG. 6 illustrates one example method of monitoring an updating the portal on a mobile device according to one or more aspects described herein. In step 600, a portal is received on a mobile device. The mobile device may be any type of mobile device and may be a device manufactured by any manufacturer. In step 602, one or more functions on the device may be interrogated to determine whether they are authorized for that device or the business group associated with the user of the device. If the device is authorized, the application may remain on the device and, in some examples, may be pulled into the portal in step 608. If the function is not approved or authorized for the business group associated with the user, the function may be removed or deleted.

In step 610 the mobile device may access a remote server housing the business group rules and applications associated with each business group. Accessing the server may be performed on a periodic (every hour, every day, and the like) or aperiodic basis. The server may also be accessed on demand. In step 612, if updates exist, the updates may be received by the device. The updates may be downloaded, may be pushed down from an administrator or, in some examples, the device may be connected (e.g. via USB cable) to a computing device and the updates may be transferred in that manner.

The above described portal and method of controlling access to various applications provides all applications a user may need or desire to perform a work function in one location. That is, access to all applications is provided at one portal, thus simplifying access to both native and Internet-based applications. Further, the portal may have a standard appearance, regardless of the type of device, manufacturer of the device or service provider associated with the device. Thus, a user portal may have the same overall appearance on various devices. This may make transitioning between devices easier for users since the applications they are using will be found in a familiar user interface, regardless of the device.

Further, because rules associating applications to business groups are resident on remote server, any changes to the rules may be immediately or almost immediately received by the mobile devices. That is, the mobile devices may be continuously or almost continuously accessing the server to assess whether updates have been provided. If so, the updates will be downloaded or forced down to the devices, thus ensuring that the appropriate applications are being accessed by users.

In some example arrangements, a user may also apply for or obtain a waiver to receive access to one or more applications not associated with the user's business group. For instance, the user may apply to receive access to an application not associated with the business group. If it is deemed important for the user to have access to the application, the waiver may be granted. If not, access to the application may be prevented.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. An apparatus, comprising:
   at least one processor; and
   memory operatively coupled to the at least one processor and storing computer readable instructions that, when executed, cause the apparatus to:
      identify a first business group, the first business group being defined based on work performed by the first business group;
      identify a first plurality of mobile applications associated with the first business group, the first plurality of mobile applications associated with the first business group being determined based on the work performed by the first business group, a level of interaction between the first business group and one or more other business groups, and data needed to perform the work performed by the first business group;
      receive identification of a first individual associated with a mobile device;
      determine whether the first individual is associated with the first business group; and
      responsive to determining that the first individual is associated with the first business group, provide access to an applications portal that includes only the first plurality of mobile applications associated with the first business group and prevent access to a second plurality of mobile applications other than the first plurality of mobile applications,
   wherein providing access to the applications portal that includes only the first plurality of mobile applications associated with the first business group includes providing access to at least one native application and at least one internet-based application, and
   wherein an application that provides the applications portal on the mobile device is configured to interrogate one or more applications on the mobile device to determine whether the one or more applications on the mobile device are associated with the first business group.

2. The apparatus of claim 1, the memory storing computer readable instructions that, when executed, further cause the apparatus to:
   responsive to determining that the first individual is not associated with the first business group, prevent access to the first plurality of mobile applications associated with the first business group.

3. The apparatus of claim 1, the memory storing computer readable instructions that, when executed, further cause the apparatus to:
   identify a second business group;
   identify a third plurality of mobile applications associated with the second business group;
   determine whether the first individual is associated with the second business group; and
   responsive to determining that the first individual is associated with the second business group, provide access to the third plurality of mobile applications associated with the second business group and prevent access to a fourth plurality of mobile applications other than the third plurality of mobile applications.

4. The apparatus of claim 3, the memory storing computer readable instructions that, when executed, further cause the apparatus to:
   responsive to determining that the first individual is not associated with the second business group, prevent access to the third plurality of mobile applications associated with the second business group.

5. The apparatus of claim 1, wherein preventing access to the second plurality of mobile applications includes deleting the second plurality of mobile applications from the mobile device of the first individual.

6. The apparatus of claim 1, wherein the second plurality of mobile applications is not associated with the first business group.

7. The apparatus of claim 1, wherein the applications portal mimics a desktop of the mobile device on which the applications portal is provided.

8. The apparatus of claim 7, wherein the applications portal is started-up automatically upon start-up of the mobile device.

9. The apparatus of claim 1, wherein providing access to the applications portal includes:
responsive to receiving information indicating a change in preferred vendors, replacing a first application of the first plurality of mobile applications with a second application, the first application being provided by a first vendor and the second application being provided by a second vendor different from the first vendor.

10. The apparatus of claim 1, wherein access to all mobile applications available to the first individual on the mobile device is provided by the applications portal.

11. The apparatus of claim 1, wherein providing access to the applications portal includes:
generating a user profile that includes the identified first plurality of mobile applications; and
providing the generated user profile to the mobile device.

12. The apparatus of claim 1, wherein the memory stores additional computer readable instructions that, when executed, further cause the apparatus to:
determine that at least one business group associated with the first individual has been updated; and
based on determining that the at least one business group associated with the first individual has been updated, remove at least one application associated with a business group previously associated with the first individual.

13. The apparatus of claim 1, wherein the memory stores additional computer readable instructions that, when executed, further cause the apparatus to:
periodically assess whether one or more updates to one or more rules associating one or more applications with one or more business groups have been provided.

14. The apparatus of claim 1, wherein access to all applications that the first individual needs to perform a specific work function in a specific work location is provided via the applications portal.

15. A method, comprising:
identifying, by a mobile application access control system, a first business group, the first business group being defined based on work performed by the first business group;
identifying, by the mobile application access control system, a first plurality of mobile applications associated with the first business group, the first plurality of mobile applications associated with the first business group being determined based on the work performed by the first business group, a level of interaction between the first business group and one or more other business groups, and data needed to perform the work performed by the first business group;
receiving, by the mobile application access control system, identification of a first individual associated with a mobile device;
determining, by the mobile application access control system, whether the first individual is associated with the first business group; and
responsive to determining that the first individual is associated with the first business group, providing access to an applications portal that includes only the first plurality of mobile applications associated with the first business group and preventing access to a second plurality of mobile applications other than the first plurality of mobile applications,
wherein providing access to the applications portal that includes only the first plurality of mobile applications associated with the first business group includes providing access to at least one native application and at least one internet-based application, and
wherein an application that provides the applications portal on the mobile device is configured to interrogate one or more applications on the mobile device to determine whether the one or more applications on the mobile device are associated with the first business group.

16. The method of claim 15, further including:
responsive to determining that the first individual is not associated with the first business group, preventing access to the first plurality of mobile applications associated with the first business group.

17. The method of claim 15, wherein preventing access to the second plurality of mobile applications includes deleting the second plurality of mobile applications from the mobile device of the first individual.

18. The method of claim 15, wherein the applications portal mimics a desktop of the mobile device on which the applications portal is provided.

19. One or more non-transitory computer readable media storing computer readable instructions that, when executed, cause a mobile application access control system to:
identify a first business group, the first business group being defined based on work performed by the first business group;
identify a first plurality of mobile applications associated with the first business group, the first plurality of mobile applications associated with the first business group being determined based on the work performed by the first business group, a level of interaction between the first business group and one or more other business groups, and data needed to perform the work performed by the first business group;
receive identification of a first individual associated with a mobile device;
determine whether the first individual is associated with the first business group; and
responsive to determining that the first individual is associated with the first business group, provide access to an applications portal that includes only the first plurality of mobile applications associated with the first business group and prevent access to a second plurality of mobile applications other than the first plurality of mobile applications,
wherein providing access to the applications portal that includes only the first plurality of mobile applications associated with the first business group includes providing access to at least one native application and at least one internet-based application, and
wherein an application that provides the applications portal on the mobile device is configured to interrogate one or more applications on the mobile device to determine whether the one or more applications on the mobile device are associated with the first business group.

20. The one or more non-transitory computer readable media of claim 19, further including instructions that, when executed, cause the mobile application access control system to:
responsive to determining that the first individual is not associated with the first business group, prevent access to the first plurality of mobile applications associated with the first business group.

* * * * *